UNITED STATES PATENT OFFICE.

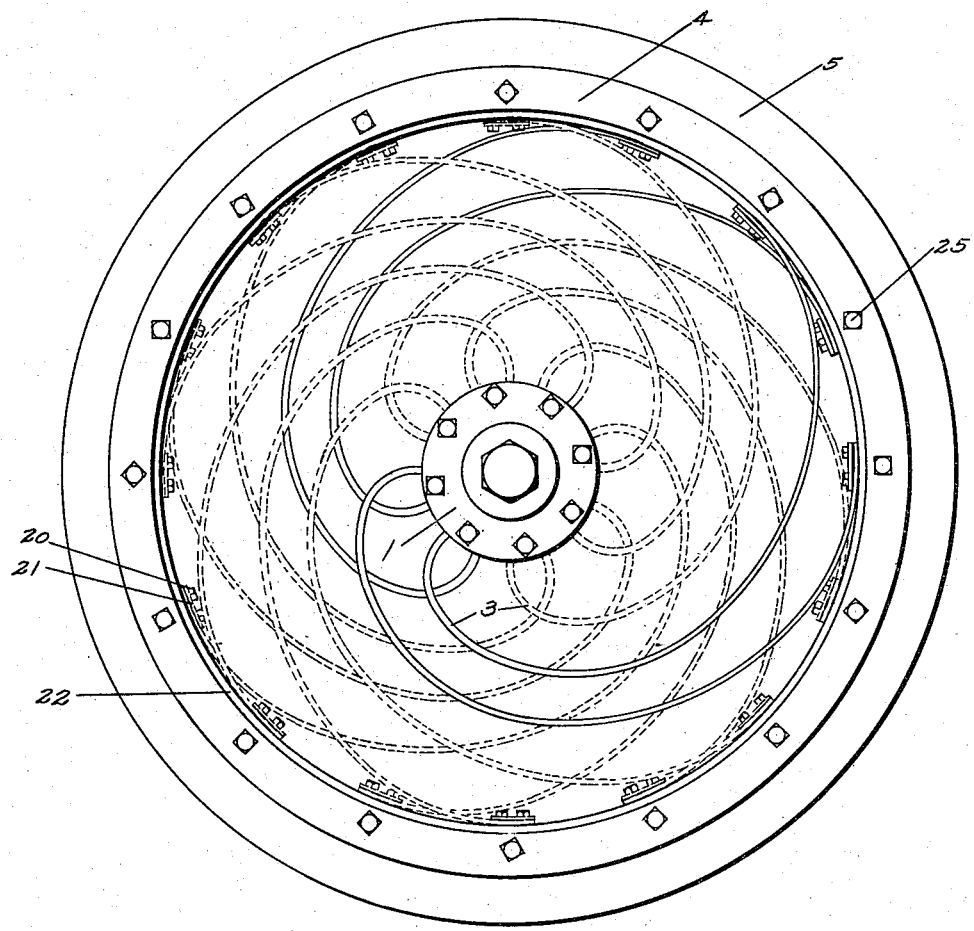

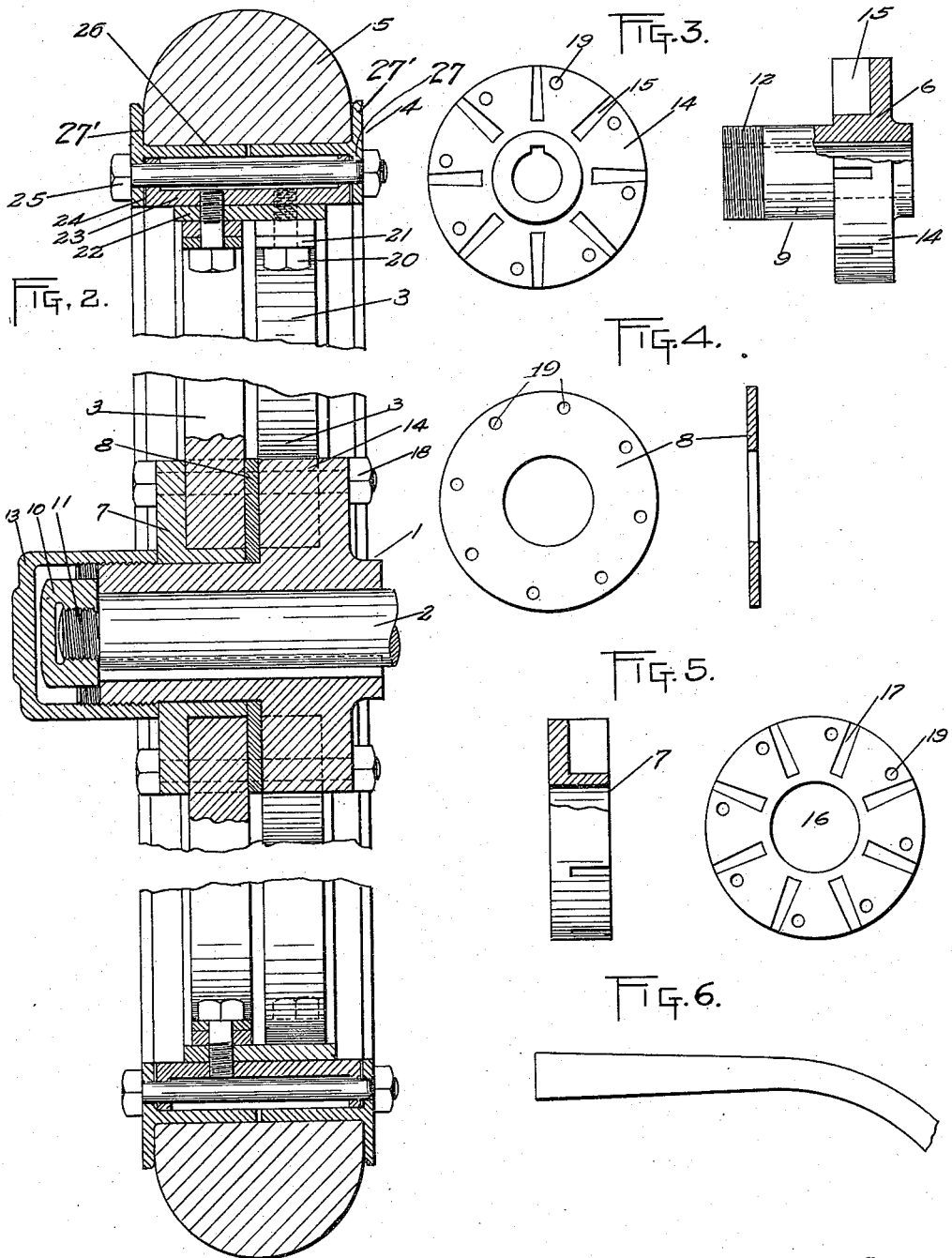

JULIUS E. STRAUCH AND JOSEPH C. WEGSTEIN, OF WASHBURN, ILLINOIS.

SPRING-WHEEL.

1,164,887. Specification of Letters Patent. Patented Dec. 21, 1915.

Application filed November 25, 1914. Serial No. 873,906.

*To all whom it may concern:*

Be it known that we, JULIUS E. STRAUCH and JOSEPH C. WEGSTEIN, citizens of the United States, residents of Washburn, in the county of Woodford and State of Illinois, have invented new and useful Improvements in Spring-Wheels, of which the following is a specification.

Our invention relates to improvements in spring wheels, the principal object being the provision of a device adapted for automobiles and other vehicles on which a solid tire may be used and which at the same time affords sufficiently yielding support therefor, so that all the advantages derived from the use of a pneumatic tire are attained and the disadvantages obviated.

A further object of our invention is the provision of such a wheel having the rim supported on the hub by means of two series of flat springs, each series extending in opposite directions and each spring being of sufficient length and curvature so that its points of attachment to the hub and rim are diametrically opposite each other.

A further object is the improvement in the hub and rim structure of a device of this character whereby the wheel may be quickly and securely assembled.

Further objects include the improvement of details of construction and arrangements of parts whereby a resilient wheel of maximum efficiency is provided.

To the accomplishment of the foregoing and such other objects as may hereinafter appear, our invention consists in the construction, combination and arrangement of parts hereinafter described and then sought to be defined in the appended claims, reference being had to the accompanying drawings forming a part hereof and which shows merely for the purpose of illustrative disclosure a preferred embodiment of our invention, it being understood, however, that various changes may be made in practice within the scope of the claims without digressing from our inventive idea.

In the drawings:—Figure 1 represents a side elevation of a wheel constructed according to our invention, parts being indicated in dotted lines in the interest of simplicity and convenience. Fig. 2 is a vertical transverse section broken away in part to facilitate disclosure. Figs. 3, 4 and 5 are detailed views of portions of the hub structure. Fig. 6 is a detail view of the hub end of one of the springs.

Referring now to the drawings, it is seen that the wheel comprises a hub structure, a rim and felly structure and resilient members connecting them, the hub generally being designated by the numeral 1, the axle 2, the springs 3, the rim and felly generally 4, and the tire 5.

The hub 1, as shown particularly in Figs. 2, 3, 4 and 5 comprises three essential parts, the parts 6 and 7 complementing each other to afford a complete anchorage for both series of spring spokes and the washer or disk 8 being interposed therebetween to hold the parts in proper spaced relation. The part 6 is formed with the sleeve portion 9 which provides the real hub and fits over the axle being held thereon by means of a nut 10 on the reduced and threaded extremity 11. The end of this sleeve 9 is exteriorly threaded as at 12 to receive the dust cap 13. This part 6 of the hub structure is also provided with means for holding the inner ends of one series of the spring spokes, this means being provided by the vertical flange or disk portion 14 which is formed with a plurality of sockets or recesses 15, one for each spoke of a series, said sockets or recesses opening out of the inner face of said flange or disk and being widened gradually toward their inner ends, as shown.

The complementary member or part 7 is in the form of a disk or plate, bored as at 16 to fit tightly over the sleeve portion 9 of member 6 and having a plurality of sockets or recesses 17 corresponding in shape and number to the sockets or recesses in disk 14 so as to receive the inner ends of the other series of spokes. The disk or washer 8 is interposed between said disk or flange members 14 and 7 and they are held in assembled relation by means of bolts 18 passing through apertures 19 therein.

Each spring 3 is of simple construction, being preferably flat and also of sufficient length so that when in assembled position it extends from its socket 15 or 17 to a point substantially diametrically opposite on the rim, whereby the maximum absorption of shock and resiliency is attained. The inner end of each spoke is slightly and gradually widened toward its extremity as shown in Fig. 6 and is also widened in width, so that each spoke is securely anchored in its socket when the parts are assembled. The outer end of each spoke is connected to the rim and felly portion 4 by means of a suitable securing means shown as a plurality of bolts or rivets 20 and having the plate or washer member 21 interposed between the heads thereof and the spoke so as to relieve the latter of the strain and stress of flexing.

The rim and felly structure 4 comprises the flat annular ring 22 having the channel iron annular member 23 secured thereto by the same means 20 that secure the spokes thereto. To the outwardly extending edges 24 of this member 23 and by means of bolt members 25, is connected the two part T-rim proper 26, having the inwardly extended flanges 27 through which the bolts 25 pass and the outwardly extending flanges 27' which receive and hold the tire 5.

From this description and disclosure it is seen that we have provided a wheel composed of few parts which may be readily assembled or taken apart for the purposes of repair, which may be readily adjusted to take up wear, in which the spring spokes are securely held in position to prevent accidental displacement and which are so arranged and constructed as to give the most efficient results in practical use.

What we claim is:—

1. A spring wheel including a hub and a rim connected by two series of curved spring spokes, the series being oppositely disposed, said hub including complementary parts each having a plurality of sockets or recesses to receive and hold the ends of the spring spokes of one series, and a washer member interposed between said complementary parts and said series of spring spokes.

2. A spring wheel including in combination, a hub and a rim connected by two series of curved spring spokes, the series being oppositely disposed to each other and each spoke being of such length and curvature that the points of attachment to the rim and hub are diametrically opposite each other, said hub including complementary parts each having a plurality of sockets or recesses to receive and hold the ends of the spring spokes of one series, the hub end of each spoke being gradually increased in width and thickness and each of the sockets or recesses being correspondingly tapered in width, and a washer member interposed between said complementary parts and said series of spring spokes.

JULIUS E. STRAUCH.
JOSEPH C. WEGSTEIN.

Witnesses:
 HENRY LESCH,
 GRANT R. IRELAND.

Copies of this patent may be obtained for five cents each, by addressing the "Commissioner of Patents, Washington, D. C."